Jan. 22, 1929.
F. E. WRIGHT
OBSERVATION INSTRUMENT
Filed March 20, 1924
1,699,827
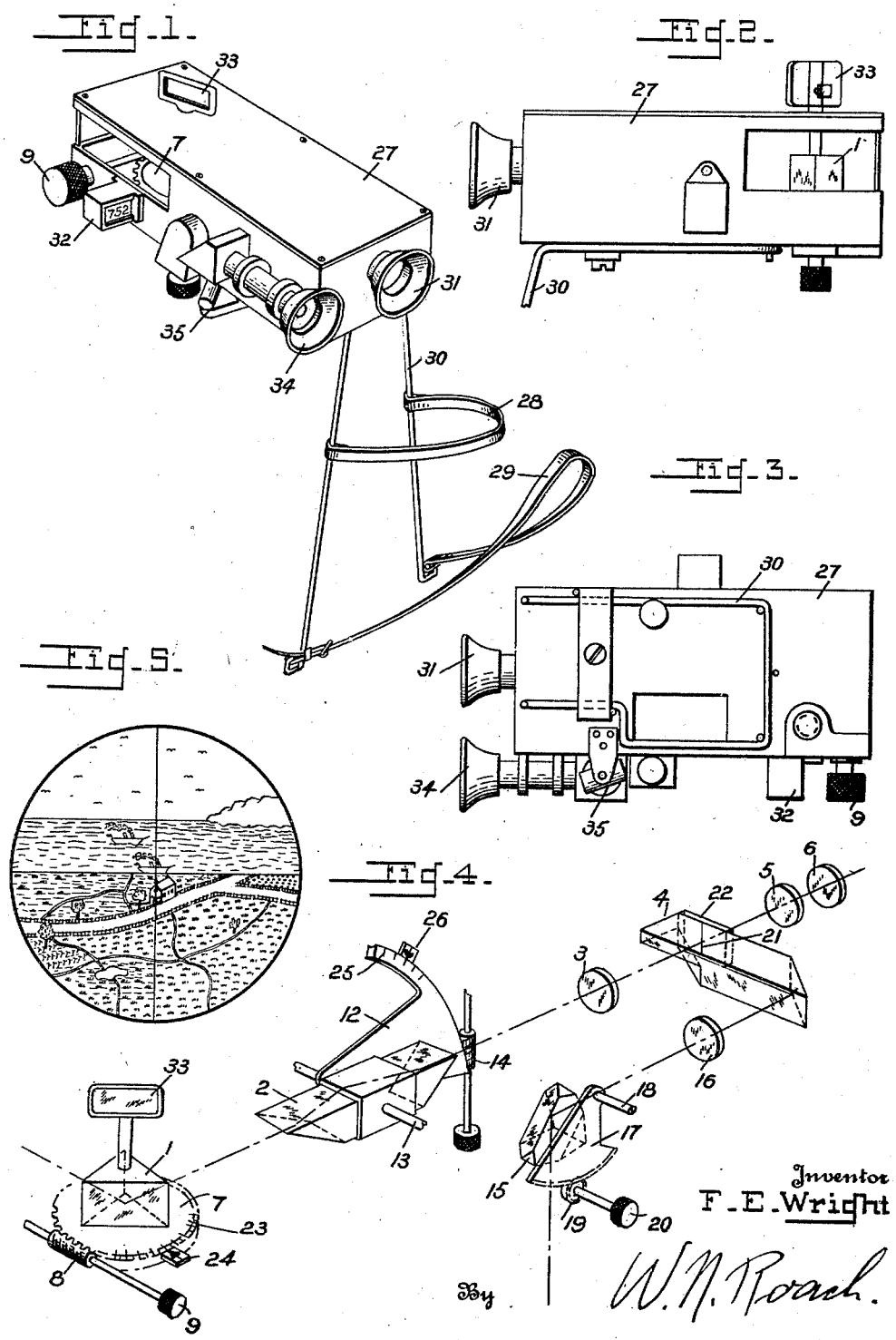

Patented Jan. 22, 1929.

1,699,827

UNITED STATES PATENT OFFICE.

FREDERICK E. WRIGHT, OF WASHINGTON, DISTRICT OF COLUMBIA, ASSIGNOR TO SECRETARY OF WAR AND HIS SUCCESSORS IN OFFICE IN TRUST FOR THE GOVERNMENT OF THE UNITED STATES.

OBSERVATION INSTRUMENT.

Application filed March 20, 1924. Serial No. 700,609.

(GRANTED UNDER THE ACT OF MARCH 3, 1883, AS AMENDED APRIL 30, 1928; 370 O. G. 757.)

The invention described herein may be manufactured and used by or for the government for governmental purposes without the payment to me of any royalty thereon, in accordance with the act of March 3, 1883, as amended April 30, 1928.

The subject of the present invention is an observation instrument, and the invention relates specifically to such instruments as are employed for determining the position of the target with reference to an aiming point or reference object.

In laying a battery, it is necessary first of all to determine the basic direction to be given the guns in order to hit the target. This direction is generally determined by laying the guns with reference to an aiming point and it is necessary in such laying to determine definitely the angular position of the target with relation to the chosen aiming point. Where the instrument used to determine the necessary data is located above the plane of the target or aiming point or both as where the data is determined by an observer in a balloon, it is necessary also to make corrections for the position of the balloon with respect to the objects observed.

The primary object of the present invention is the establishment of a method and the provision of any instrument by which the angle between the target or other object observed and the aiming point or reference object may be directly determined. A further object of the invention is the provision of an instrument in which the depression or dip angle of the target or object observed as seen from a balloon or elevated observing station may be directly measured.

With the above and other objects in view, my invention consists in the steps comprising my process and in the novel arrangement and combination of parts and in the details of construction hereinafter described and claimed, it being understood that changes in the precise embodiment of the invention herein disclosed may be made within the scope of what is claimed without departing from the spirit of the invention.

In carrying out my invention, I have found it preferable to employ a plurality of horizontal optical systems arranged in parallelism and having a common eye-piece. The field of view as seen through the eye-piece is divided by a horizontal line as in the ordinary self-contained range finder, the upper portion of the field containing an erect image of the target or other object observed and the lower portion containing the image of the aiming or reference point. A vertical cross line is employed also for accurately aligning the images to obtain the necessary data.

A preferred embodiment of an instrument constructed according to my invention and employed in the manner constituting the process which forms one of the subjects of this invention is illustrated in the accompanying drawing, in which, Fig. 1 is a perspective view of such an observation instrument looking at the left side thereof;

Fig. 2 is an elevation of the right hand side of the instrument;

Fig. 3 is a bottom plan view of the instrument;

Fig. 4 is a view showing diagrammatically the arrangement of the principal parts of the instrument; and Fig. 5 is a view of the field of the instrument.

Referring to the drawing by numerals of reference and particularly to Fig. 4, I have shown an observation instrument in which two parallel optical systems having a common eye-piece are employed. The right hand optical system consists preferably of the optical elements necessary to form an erect image of the object observed through such system. The left hand system which is independently operable with respect to the right hand system consists likewise of optical elements capable of forming an erect image of the object observed through this system. The images formed by the two systems are so directed as to have a complemental portion of the rays of light forming such images obscured or diverted and the undiverted portions directed so as to form a single field in which the undiverted portions of such images occupy separate parts.

As shown, the right hand system consists preferably of the 90° prism 1, the dove prism 2, the objective lens 3, the ocular prism 4, the field lens 5 and the eye lens 6. This system is the main telescope which views the target and forms its image in the upper half of the field of view. Light proceeding from the target strikes the 90° prism 1, which is mounted for rotation upon a worm wheel 7 which is capable of motion through 360° about a vertical axis perpendicular to the line of sight and which may be rotated by means of a worm 8 manipulable by the knob 9. From the 90° prism the rays of light pass to the dove prism 2.

This dove prism 2 is preferably mounted for rotation about an axis at right angles to the axis of rotation of the prism 1. As shown, this prism 2 is secured to a sector 12 mounted upon a rotatable shaft 13. A worm 14 may be employed to move the sector and through the sector the prism 2 for a purpose hereinafter to be described.

The rays of light after leaving the dove prism 2 enter the objective lens 3, which erects the image and then pass to the ocular prism 4. This ocular prism is constructed preferably of two independent prisms, each formed so as to divert a portion of the rays of light which fall thereon and direct the undiverted portion toward the lenses 5 and 6. As shown, this ocular prism consists of two oblique prisms arranged one above the other. The upper half of the cone of rays from the objective lens will pass directly through the ocular prism to the focal plane of the objective lens where the image there formed is magnified by the eye-piece which includes the lens 5 and the lens 6. The lower half of the cone of rays strikes the oblique reflecting surface of the ocular prism which diverts them to the right so that they do not enter the eye-piece. The juncture of the two optical prisms comprising the ocular prism forms a sharp dividing line between the halves of the field.

Rotation of the knob 9 causes the image of the target in the upper half of the field to move from right to left and rotation of the worm 14 causes this same image to move up or down depending in both cases upon the direction of rotation of the knobs.

The left hand optical system will preferably include also such elements as are capable of forming an erect image of the reference or aiming point. This system may, therefore, consist of elements similar to those forming parts of the right hand system, but for the sake of avoiding unnecessary weight, I have found it preferable to employ a roof edge prism 15 and an objective lens 16. This system is used for producing an erect image of any particular aiming or reference point which may be chosen in the lower half of the field of view of the eye lens 5 and 6 so that the azimuth of a given target may be measured with relation to such aiming or reference point. The rays of light forming the image of the aiming or reference point enter the roof edge roof-angle prism 15, pass through the lens 16 and are directed into the ocular prism 4 where the upper portion of the rays strike the oblique surface of such prism and are diverted out of the system, while the lower portion striking the same oblique surface being deflected and striking the opposite oblique surface and being again deflected pass through the prism and into the eye-piece comprising the lenses 5 and 6 there to form the lower half of the field of view.

The roof edge prism is preferably mounted for rotation as upon a sector 17 mounted upon a shaft 18 and moved by means of the pinion 19 which can be rotated on rotation of a knob 20. The motion of the prism 15 is such, therefore, that aiming or reference points varying in location from directly underneath the observer to points on the same plane may be observed.

A vertical line 21 is etched across the rear surface of the ocular prism, that is, the surface nearest to the field lens 5. To prevent the accumulation of dust and moisture at this point, a glass plate 22 is preferably cemented to the prism.

To make an observation with an aiming instrument employing the elements described or elements having the same function, the instrument itself, must first be pointed in the direction of the aiming point. The aiming point is, then, formed in the field by rotating the prism 15 until the image of the aiming point is brought up to the dividing line at the juncture of the two prisms forming the ocular prism 14. Having centered the aiming point in the middle of the field as indicated by the vertical cross hair 21, the prism 1 is then rotated until the image of the target as seen in the upper half of the field is brought into vertical alignment with the image of the aiming point as indicated by the cross hair 21. The sector 12 and the dove prism 2 mounted thereon are then rotated to bring the image of the target into juxtaposition with the image of the aiming point as indicated by the line marking the juncture of the two prisms forming the composite ocular prism 4.

The amount of movement necessary to bring the image of the target into vertical alignment with the image of the aiming or reference point after the latter image has been centered in the field is the measurement of the horizontal angle between the aiming point and the target. Any suitable means may be employed for determining the amount of such movement. As shown, the worm wheel 7 is engraved with a scale 23 graduated in azimuth and readable against an indicator 24.

Likewise the amount of movement of the sector 12 necessary to bring the image of the target into juxtaposition to the image of the aiming point after the latter image has been brought to the horizontal cross hair, formed by the juncture of the two prisms in the prism 4, is the measure of the dip angle or the depression of the target as seen from the balloon. Any suitable means may be employed for determining the amount of the last mentioned movement. As shown, the sector 12 is engraved with suitable graduations 25 readable against an index 26. For all ordinary purposes the reading on the scale 25 will be sufficiently accurate. However, a slight correction due to the earth's curvature should be applied to the angle of depression for targets at relatively long ranges, but for ordinary work such a correction is unnecessary.

A field such as might be formed in an observation instrument such as described is shown in Fig. 5, in which the steeple has been used as an aiming point and one of the stacks of the steamer in the foreground as a target.

The elements comprising the optical systems described may be mounted for use in any suitable way. In practice, I have found it preferable to mount the same in an oblong metal casing 27 such as shown in Figs. 1, 2 and 3. This casing may be of such size as to be readily portable and may be supported by means of straps 28 and 29 secured to the person of the observer and to bracket arms 30 attached in any suitable manner to the casing. The elements of the two systems which are substantially the same as already described, are mounted in the casing in any suitable manner. The eye-piece, comprising the lenses 5 and 6 will be incorporated preferably in a eye-piece mounting 31 and instead of indicators such as shown at 24 and 26, Veeder counters driven by gearing from the worm 7 or sector 12 may be employed. One of such counters is indicated at 32 where the same replaces the indicator 24. As considerable difficulty might be experienced in initially directing the 90° prism, at the target, I have found it desirable to mount a mirror 33 outside the casing in such a manner as to be rotatable with the 90° prism. As shown, the mirror is mounted so as to directly rotate with the 90° prism. By looking over the top of the casing and rotating the knob 9, the target may be easily located in the mirror and fine adjustment may then be made by observation through the telescope 31.

An observation would be inaccurate were the instrument itself not level. I have found it preferable to employ some means for indicating the horizontal and vertical positions of the instrument during observation. As shown, I employ a low power telescope 34 which may be mounted upon one side of the casing 27 and which is so constructed as to make observation of the spirit level 35 possible at all times. While I have illustrated a single level rotatable about a vertical axis, it will be understood that two or more levels may be employed so that the instrument may at all times be maintained in true vertical and horizontal position. The telescope 34 is so mounted with respect to the telescope 31 that observation through the two telescopes, one for each eye, is simultaneously possible so that the observer can simultaneously bring the images of the target and the aiming or reference point into the desired relation while keeping the instrument in its true horizontal and vertical positions.

It is to be observed that no scale has been provided for measuring the angular movement of the roof edge prism 15 necessary to bring the aiming point into proper position in the field. No such scale has been provided since this angular movement is of no importance in locating the target.

While I have described particular optical elements for obtaining the desired results, it is obvious that any other known elements capable of producing equivalent results may be substituted therefor. It is further to be noted that for the ocular prism 4, any other means capable of diverting or obscuring a portion of the images formed in the two systems may be substituted.

While I have found it preferable to employ my system in connection with an observing instrument it is obvious that the method of determining data upon which the particular mechanism described is based may be used in connection with reflectors, screens, or similar devices, and that the use of a telescope is not essential.

While my system has been described in connection with two independent optical systems, it is obvious that the number of these systems may be increased without altering the function of my invention, providing means is employed for diverting proper portions of the fields of such systems so as to form a composite field including a portion only of the image formed by each system. An instrument containing such a plurality of optical systems might be employed to measure directly angles between a plurality of objects.

With the system described and with an instrument constructed in the matter illustrated and described, it is possible to determine directly the angle between the two or more objects observed. By forming separate images of the objects observed by bringing these images into determinate relation and by measuring the amount of movement necessary to bring the images into determinate relation, data may be directly computed. By forming erect images of the objects observed moreover, a more accurate reading is possible than otherwise would be obtainable; in fact it is possible only by the use of erect images to make satisfactory observations from a moving or swaying platform.

Having thus described my invention, what I claim is:

1. An observing instrument including an optical system embodying a right angle prism adapted to be directed at an object to be observed, a dove prism, and an objective lens, said prisms and lens being so arranged that the rays of light from the object pass successively through the prisms and lens and form an erect image of the object, a second optical system adapted to form an erect image of a second object, a common eye-piece for the systems, an ocular prism adapted to receive rays of light from the objective lens and from the second optical system and to divert complemental portions of such rays whereby to form a field in the eye-piece in which the images of both objects occupy separate positions, said observing instrument being capable of bodily movement to bring the image formed by the second system into a predetermined vertical position in the field, means for moving said right angle prism to bring the image formed by the other system into alignment with the image formed by the second system, means for moving an element of the second system to bring the image formed thereby into the desired horizontal position in the field, means for moving the dove prism to bring the image formed by the first system into juxtaposition with the image formed by the second system, means actuated by movement of the right angle prism for indicating the amount of such movement, means actuated by movement of the dove prism for indicating the amount of such movement, means for indicating the position of the observing instrument, and a telescope for enabling the observer while using the eye-piece to simultaneously observe said last named indicating means.

2. An observing instrument including a right angle prism adapted to be directed at an object to be observed, a dove prism, an objective lens, said prisms and lens being so arranged that the rays of light from the object pass successively through the prisms and lens to form an erect image of the object, an optical system adapted to form an erect image of a second object, an ocular prism adapted to receive the rays of light from the objective lens and from the second optical system and to divert complemental portions of such rays whereby to form a field in which the images of both objects occupy separate positions, said observing instrument being capable of bodily movement to bring the image formed by the second system into a predetermined vertical position in the field, means for moving said right angle prism to bring the image formed by the other system into vertical alignment with the image formed by the second system, means actuated by movement of the right angle prism to indicate the amount of such movement, means for moving an element of the second system to bring the image formed thereby into the desired horizontal position in the field, means for moving the dove prism to bring the first image into juxtaposition with the image formed by the second system, and means actuated on movement of the dove prism to indicate the amount of such movement.

3. An observing instrument including a right angle prism adapted to be directed at an object to be observed, a dove prism, an objective lens, said prisms and lens being so arranged that the rays of light from the object pass successively through the prisms and lens to form an erect image of the object, an optical system adapted to form an erect image of a second object, an ocular prism adapted to receive rays of light from the objective lens and the second optical system and to divert complemental portions of such rays whereby to form a field in which the images of both objects occupy separate positions, means for moving said right angle prism to bring the image formed by the two systems into vertical alignment, means actuated on movement of said prism to indicate the amount of such movement, means for moving the dove prism to bring the images into juxtaposition, and means for indicating the amount of such movement.

4. An observing instrument including a right angle prism adapted to be directed at an object to be observed, a dove prism, an objective lens, said prisms and lens being so arranged that the rays of light from the object pass successively through the prism and lens to form an erect image of the object, an optical system adapted to form an erect image of a second object, an ocular prism adapted to receive rays of light from the objective lens and from the second optical system and to divert complemental portions of such rays whereby to form a field in which the images of both objects occupy separate positions, means for moving said images into a determinate relation to each other, and means for measuring the amount of such movement.

5. An observing instrument including a plurality of optical systems each formed of a number of elements and each capable of producing an erect image of an object observed through that system, means for diverting a portion of the rays of light forming the image produced by each system and simultaneously forming a field in which the images produced by the undiverted rays occupy separate parts, one of said systems being capable of movement to bring the image formed by the same into a predetermined vertical position in the field, means for moving an element of the other system to bring the image formed by the same into vertical alignment with the other image, means actuated by movement of such element to indicate the amount of such movement, means for moving an element of the first system to bring the image produced by the same into a predetermined horizontal position in the field, means for moving an element of the other system to bring the images produced by the same into juxtaposition with the first image, and means actuated by movement of the last named element to indicate the amount of such movement.

6. An observing instrument including a plurality of optical systems, each formed of a number of elements and each capable of producing an erect image of an object observed through that system, means for diverting a portion of the rays of light forming the images produced by each system and simultaneously forming a field in which the images produced by the undiverted rays occupy separate positions, one of said systems being capable of movement to bring the image formed by the same into a predetermined position in the field, means for moving an element of the other system to bring the image formed by the same into alignment with the first image, means actuated by movement of such element to indicate the amount of such movement, means for moving the images into juxtaposition, and means actuated by the last named means for indicating the amount of such movement.

7. An observing instrument including a plurality of optical systems, each capable of producing a field containing an erect image of an object observed through that system, means for diverting a portion of the rays of light forming the image produced by each system and for simultaneously assembling the undiverted portions to form a composite field in which the images formed by the undiverted rays occupy separate positions, one of the images being adapted to be moved into a predetermined position in the field, means for moving another image into vertical alignment with the first image, means actuated by movement of the last named means for indicating the amount of such movement, means for moving the first image into a predetermined horizontal position in the field, means for moving the second image into juxtaposition with the first image, and means actuated on movement of the last named means for indicating the amount of such movement.

8. An observing instrument including a plurality of independent optical systems, each capable of producing a field containing an erect image of an object observed through that system, means for diverting a portion of the rays of light forming the image produced by each system and for simultaneously assembling the undiverted portions of such rays to form a composite field in which the images formed by the undiverted rays occupy separate positions, one of the images being adapted to be moved into a predetermined vertical position in the field, means for moving another image into vertical alignment with the first image, means actuated by the last named means for indicating the amount of such movement, means for moving the respective images into juxtaposition, and means for indicating the amount of such movement.

9. An observing instrument including a plurality of independent optical systems each capable of producing a field containing an erect image of an object observed through that system, means for diverting a portion of the rays of light forming the images produced by each system, and for simultaneously assembling the undiverted portions to form a composite field in which the images formed by the undiverted rays occupy separate positions, means for moving such images into vertical alignment, means for indicating the amount of such movement, means for moving said images into juxtaposition and means for indicating the amount of such movement.

10. An observing instrument including a plurality of optical systems, each capable of producing an erect image of a separate object observed through that system, means for obscuring a portion of the image formed by each system and for simultaneously forming a field in which the unobscured portions of the images formed by each system occupy separate positions, and means for independently changing the respective positions of the elements of each optical system to bring the respective images formed by the unobscured rays of each system into a determinate relation to one another.

11. An observation instrument embodying, two ocular systems, an eye piece common to both systems, one system adapted to present an image of a predetermined fixed object, adjustable means in such system for moving the image to a fixed position in the field of view, the other system adapted to present an image of the target, an element in said system adjustable to bring the image of the target vertically above the image of the fixed object, means associated with said element for indicating the angular deflection in azimuth of the target, an element in said system adjustable to move the image of the target vertically into juxtaposition with the image of the fixed object, and means associated with said last named element for indicating the angle of dip of the target.

12. An observation instrument embodying two ocular systems, an eye piece common to both systems, one system adapted to present an image of a predetermined fixed object, said system adjustable to move the image into a fixed position in the field of view, the other system adapted to present an image of the target, means for adjusting said second system to bring the image of the target into proper correlation with the image of the fixed object, and means for indicating the amount of such adjustment, whereby the angular deflection and dip of the target may be determined.

FREDERICK E. WRIGHT.